Figure 1:
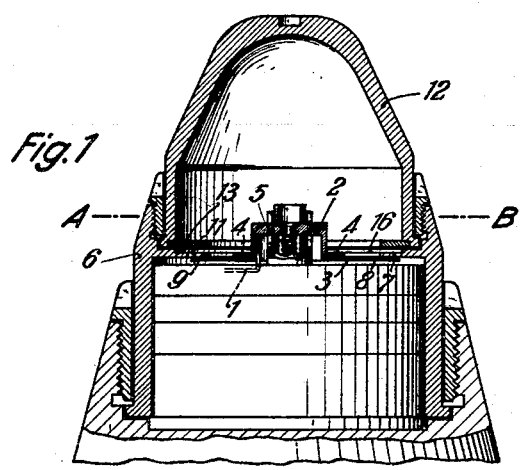

Dec. 30, 1930.  P. LIEBERGELD  1,786,664

MECHANICAL TIME FUSE WITH CLOCKWORK

Filed Feb. 20, 1930

P. Liebergeld
INVENTOR

By: Marks & Clerk
ATTYS.

Patented Dec. 30, 1930

1,786,664

UNITED STATES PATENT OFFICE

PAUL LIEBERGELD, OF BAD THAL, GERMANY

MECHANICAL TIME FUSE WITH CLOCKWORK

Application filed February 20, 1930, Serial No. 430,051, and in Germany December 8, 1927.

My invention relates to mechanical time fuses with clockwork and adjustable timing rings having recesses, which rings retain the indicator of the clockwork during part of its rotation until it is released by the recess and operates the fuse pin for igniting the primer.

It is an object of my invention to enlarge the angle through which the indicator rotates before igniting the primer, so that the scale for adjusting the timing rings becomes longer and can be more finely divided.

To this end, I provide means for varying the relative position of the recesses in the several rings.

For instance, in a fuse having two timing rings which will be described—it being understood that I am by no means limited to a fuse having two, or any definite number, of rings—the rings may be so set that their recesses register and will then act as a single ring, or they may be set so that the recess in the second ring is staggered with respect to that in the first ring. In this case the indicator after having been released by the first ring is intercepted by the second ring, and released only when the indicator arrives at the recess of the second ring.

By these means I may provide a scale which extends over all the rings of the fuse, as distinguished from the existing fuses in which only one ring has a scale while the other rings serve for fine adjustment within the scale. With the rings fixed and the indicator rotating, an absolutely exact adjustment is obtained, and compensation, as in the fuses having rotary rings and a fixed indicator, is eliminated.

In a preferred embodiment of my invention the last ring of the set is fixed to an adjustable cap.

In the accompanying drawing a fuse having two timing rings is illustrated diagrammatically by way of example.

In the drawings

Figure 2:
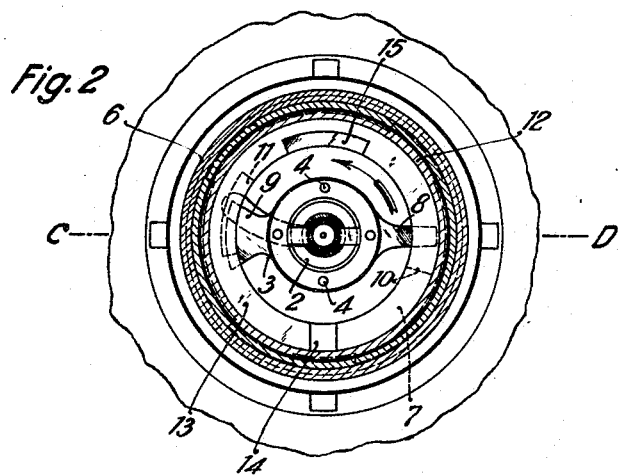
Figure 3:
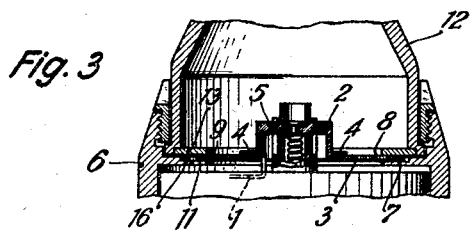

Fig. 1 is an axial section of the fuse, with the indicator engaged by the lower ring, Fig. 2 is a section on the line II—II in Fig. 1, and Fig. 3 is a section like Fig. 1 but showing the indicator engaged by the last ring.

Referring now to the drawings, $a$ is the body of the fuse, 6 is the lower ring cap which is clamped in the body of the fuse by a threaded ring $b$, and is integral with the first or lower ring 7; 10 and 11 are recesses in the ring 7, 12 is the upper cap which is fitted to rotate in the lower cap 6 by a sleeve $c$, and 13 is the upper timing ring, with the recesses 14 and 15, which is secured in, or integral with, the cap 12.

1 is the releasing lever, under the control of a boss 2, and 3 is the indicator at the boss 2. The indicator may be integral with the boss 2, or riveted thereto at 4. 5 is a spring tending to move the boss, with the indicator, toward the fuse pin, not shown. 8 and 9 are the two arms of the indicator 3 which are held engaged below the first ring by the reaction of the spring 5 and lock the boss 2 against axial displacement under the action of the spring until the arms of the indicator have been rotated into registering relation with the recesses 10 and 11 by the clockwork, not shown. The recesses are somewhat wider than the arms so that the arms will not stick. The upper ring 13 is provided with recesses 14 and 15 which are exactly like the recesses 10, 11 in the lower ring as to size and position, and may be moved into registering relation with the recesses 10, 11. The two timing rings are pitched apart for a distance somewhat in excess of the thickness of the indicator 3.

The fuse is set for a given time of flight by adjusting the caps 6 and 12. For instance, the caps are set so that the recesses in the rings are in registering relation. The arm 8 of the indicator 3 is retained by the usual means, not shown, which, when the fuse is discharged from the gun, are automatically moved into inactive position. The indicator now starts to rotate under the action of the clockwork until it reaches the recesses and the spring 5 moves the boss 2 so as to fire the primer. When the rings are set by their respective caps so as not to register at their recesses, the indicator, when released by the lower ring, will be retained by the upper ring until it reaches the recesses in that ring, and may be further retained by any further rings until it has reached the recesses in the last ring, and is finally released. In the example illustrated, with two rings 7 and 13, the lower ring 7 may be set with its recesses 10, 11 at 90 degs. from the initial position of the indicator 3, and the upper ring 13 with its recesses 14, 15 at 180 degs. from such position. The indicator is now released after performing ½ revolution. By suitably adjusting the caps 6 and 12 it is possible to delay the firing until the indicator has performed two revolutions.

The scale, not shown, on the upper cap 12 may be a continuation of the scale on the lower cap 6, the two scales being divided uniformly. However, a separate and independent scale may also be provided on the cap 2.

Any number of rings, and any number of means, with a continuous scale or independent scales, for rotating the rings may be provided.

I claim:

1. A mechanical time fuse having clockwork, an indicator rotated by such clockwork, and timing rings for controlling the active position of said indicator with respect to the means for firing said fuse, and comprising means for varying the relative position of said rings.

2. A mechanical time fuse having clockwork, an indicator rotated by such clockwork, and timing rings for controlling the active position of said indicator with respect to the means for firing said fuse, and comprising means for varying the position of said rings with respect to the initial position of said indicator, and with respect to each other.

3. A mechanical time fuse having clockwork, an indicator rotated by such clockwork, and timing rings for controlling the active position of said indicator with respect to the means for firing said fuse, and comprising means for adjusting said rings independently of each other, and a separate and independent scale on each of said means.

4. A mechanical time fuse having clockwork, an indicator rotated by such clockwork, and timing rings for controlling the active position of said indicator with respect to the means for firing said fuse, and comprising means for adjusting said rings independently of each other, and a continuous scale extending all over said means.

In testimony whereof I have signed my name to this specification.

PAUL LIEBERGELD.